(12) United States Patent
Dalmatov

(10) Patent No.: US 12,147,678 B2
(45) Date of Patent: Nov. 19, 2024

(54) HANDLING DATA WITH DIFFERENT LIFETIME CHARACTERISTICS IN STREAM-AWARE DATA STORAGE EQUIPMENT

(71) Applicant: EMC IP Holding Company LLC, Hopkinton, MA (US)

(72) Inventor: Nickolay Dalmatov, Saint Petersburg (RU)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 16/965,900

(22) PCT Filed: Jul. 25, 2019

(86) PCT No.: PCT/RU2019/000523
§ 371 (c)(1),
(2) Date: Jul. 29, 2020

(87) PCT Pub. No.: WO2021/015636
PCT Pub. Date: Jan. 28, 2021

(65) Prior Publication Data
US 2023/0176743 A1 Jun. 8, 2023

(51) Int. Cl.
*G06F 3/06* (2006.01)

(52) U.S. Cl.
CPC .......... *G06F 3/0616* (2013.01); *G06F 3/064* (2013.01); *G06F 3/0652* (2013.01); *G06F 3/0679* (2013.01)

(58) Field of Classification Search
CPC ...... G06F 3/064; G06F 3/0652; G06F 3/0679; G06F 3/0616

USPC ........................................................ 711/102
See application file for complete search history.

(56) References Cited

U.S. PATENT DOCUMENTS

| | | | |
|---|---|---|---|
| 9,460,008 B1* | 10/2016 | Leshinsky | G06F 12/0253 |
| 2003/0163633 A1 | 8/2003 | Aasheim et al. | |
| 2012/0272036 A1 | 10/2012 | Muralimanohar et al. | |
| 2012/0297122 A1* | 11/2012 | Gorobets | G06F 3/068 711/E12.008 |
| 2016/0179398 A1* | 6/2016 | Ioannou | G06F 3/0608 711/103 |
| 2016/0188221 A1* | 6/2016 | Janik | G06F 3/0611 711/103 |
| 2017/0242625 A1* | 8/2017 | Pandurangan | G06F 3/0659 |
| 2017/0344491 A1 | 11/2017 | Pandurangan et al. | |
| 2018/0250774 A1 | 9/2018 | Symeonidis et al. | |
| 2018/0307598 A1* | 10/2018 | Fischer | G06F 3/0643 |
| 2019/0042146 A1* | 2/2019 | Wysoczanski | G06F 12/0846 |

* cited by examiner

*Primary Examiner* — Gautam Sain
(74) *Attorney, Agent, or Firm* — BainwoodHuang

(57) ABSTRACT

Techniques for handling data with different lifetime characteristics in stream-aware data storage systems. The data storage systems can include a file system that has a log-based architecture design, and can employ one or more solid state drives (SSDs) that provide log-based data storage, which can include a data log divided into a series of storage segments. The techniques can be employed in the data storage systems to control the placement of data in the respective segments of the data log based at least on the lifetime of the data, significantly reducing the processing overhead associated with performing garbage collection functions within the SSDs.

18 Claims, 6 Drawing Sheets

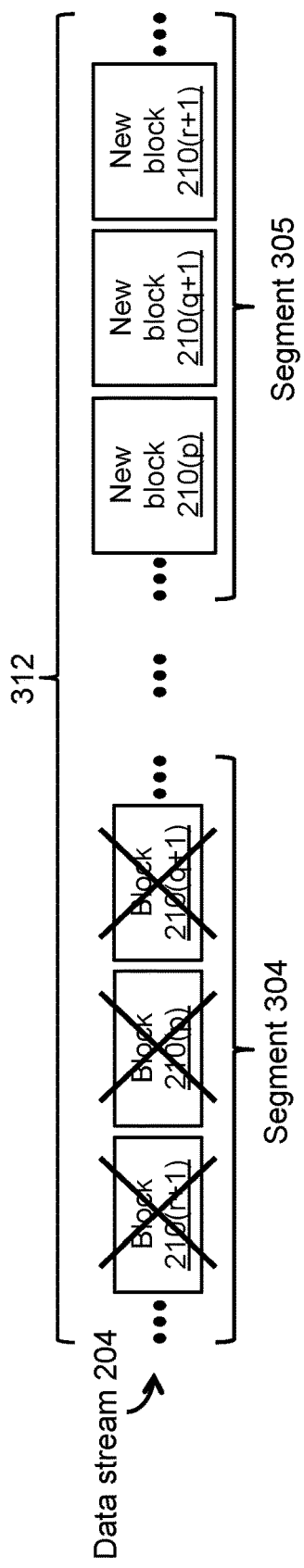
*Fig. 3b*
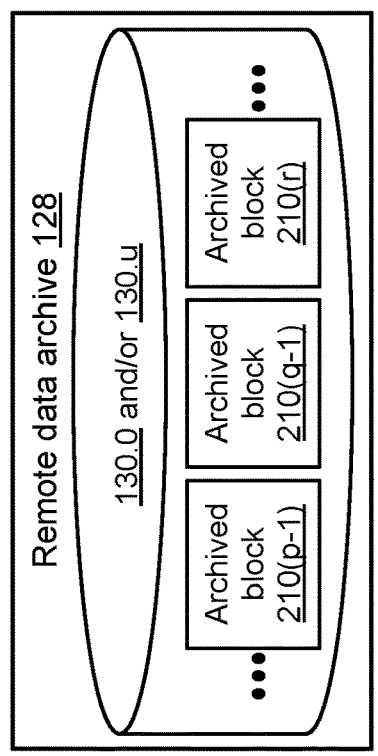
*Fig. 3c*
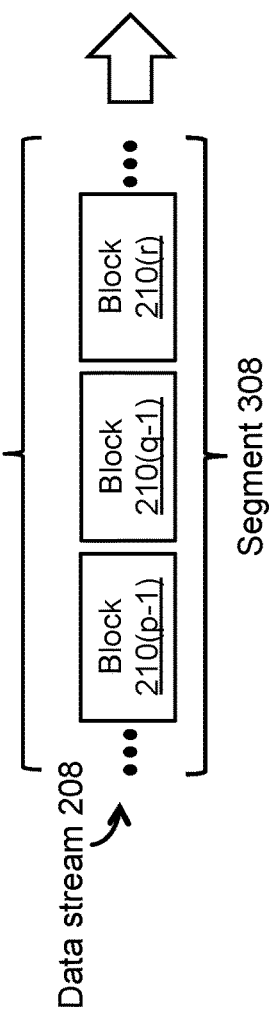

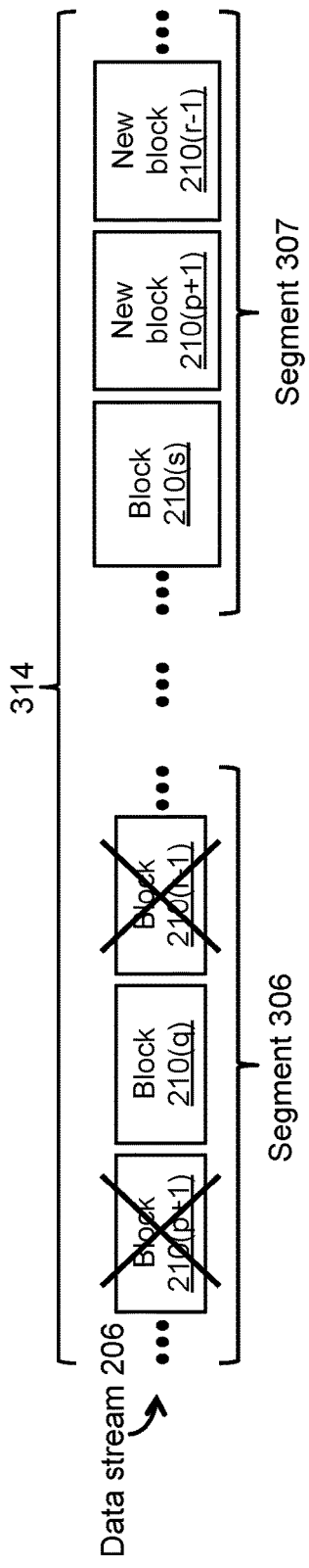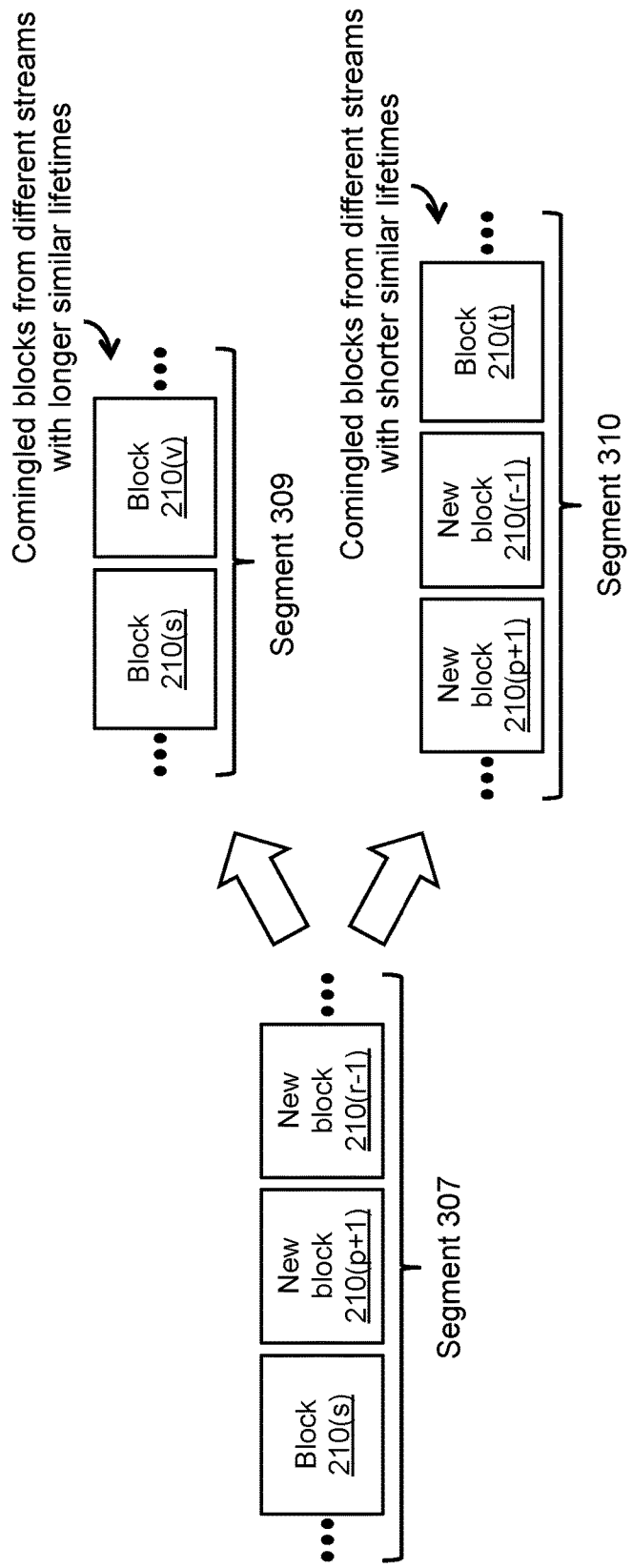

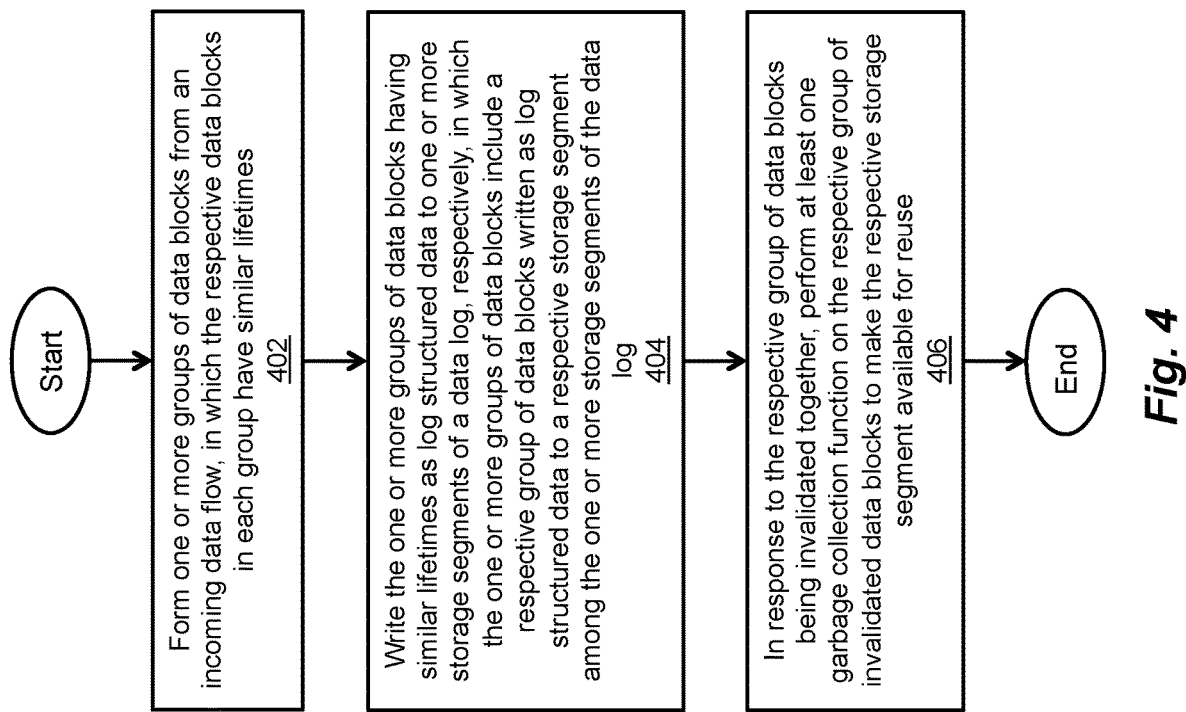

HANDLING DATA WITH DIFFERENT LIFETIME CHARACTERISTICS IN STREAM-AWARE DATA STORAGE EQUIPMENT

CROSS REFERENCE TO RELATED APPLICATIONS

This application claims benefit of the priority of International Patent Application No. PCT/RU2019/000523 filed Jul. 25, 2019 entitled HANDLING DATA WITH DIFFERENT LIFETIME CHARACTERISTICS IN STREAM-AWARE DATA STORAGE EQUIPMENT.

BACKGROUND

Data storage systems include storage processing circuitry coupled to arrays of non-volatile storage devices, such as, for example, solid state drives (SSDs), hard disk drives (HDDs), optical drives, and so on. The storage processing circuitry is configured to service host-generated storage input/output (IO) requests, which specify data blocks, data files, data pages, and/or other data elements to be created on, read from, written to, and/or deleted from the respective non-volatile storage devices. Such storage processing circuitry is further configured to execute software programs for managing the storage IO requests, and for performing various data processing tasks to organize and/or secure the data blocks, data files, data pages, and/or other data elements on the respective non-volatile storage devices.

SUMMARY

Data storage systems can be configured to include file systems that have a log-based architecture design, and to employ non-volatile storage devices that provide log-based data storage. Such non-volatile storage devices (e.g., SSDs) can be configured to implement a non-volatile storage structure (also referred to herein as a "data log"), which can be divided into a series of storage segments of equal or varying size. Storage processing circuitry included in the data storage systems can service storage IO requests (e.g., write requests, read requests) generated by host computers for writing/reading data to/from the SSDs. Once the storage processing circuitry has received a full segment's worth of data, the received data can be written to a next unoccupied (or available) segment of the data log implemented on the SSDs. If any portion (e.g., one or more data blocks) of the received data has been previously written to a preceding segment of the data log, then the SSDs can invalidate those data blocks in the preceding segment. To reclaim storage space occupied by the invalidated data blocks and reduce fragmentation, the SSDs can perform garbage collection functions, which can combine or consolidate any valid data blocks remaining in the preceding segment, copy the valid data blocks to unoccupied storage space in a next available segment of the data log, and erase the data blocks in the preceding segment to make its storage space available for reuse.

Unfortunately, data storage systems that employ SSDs for providing log-based data storage have drawbacks. For example, storage IO requests serviced by storage processing circuitry within the data storage systems can include not only sequential write requests directed toward data blocks having sequential logical addresses, but also random write requests directed toward data blocks having non-sequential logical addresses. However, the processing overhead (e.g., combining/consolidating data blocks, copying data blocks, erasing data blocks, etc.) associated with performing garbage collection functions can be high for SSDs that support such sequential and/or random write requests, resulting in increased write amplification within the SSDs and potentially reducing their useful lifespans.

Techniques are disclosed herein for handling data with different lifetime characteristics in stream-aware data storage systems. The disclosed techniques can be employed in data storage systems to control the placement of data within non-volatile storage devices (e.g., SSDs) based at least on the lifetime of the data, significantly reducing the processing overhead associated with performing garbage collection functions within the SSDs. Such a stream-aware data storage system can include storage processing circuitry configured to service host-generated storage IO requests (e.g., write requests, read requests), which can direct the data storage system to write and/or read data blocks, data files, data pages, and/or other data elements to/from file systems, logical units (LUNs), and/or any other suitable storage objects. The stream-aware data storage system can further include a file system that has a log-based architecture design, and can employ one or more SSDs that provide log-based data storage, which can include a data log divided into a series of storage segments of equal or varying size.

In the stream-aware data storage system, storage processing circuitry can service host-generated write requests that direct the data storage system to write a plurality of data blocks of a data file to the log-based file system. The storage processing circuitry can monitor the lifetime of each such data block (e.g., by monitoring how frequently the data block is modified, updated, overwritten, unmapped, read, or otherwise accessed), and form one or more groups of data blocks having similar lifetimes. Once such a group of data blocks includes a full segment's worth of data, the storage processing circuitry can write the group of data blocks to the log-based file system, which, in turn, can write the group of data blocks to a next unoccupied (or available) segment of the data log implemented on one or more of the SSDs. Such an SSD can include a stream interface that allows the storage processing circuitry to associate, bind, and/or assign a stream identifier (ID) to each data block in each group of data blocks having similar lifetimes. Having associated, bound, or assigned a stream ID to each data block, the storage processing circuitry can write each group of data blocks having similar lifetimes and the same stream ID to the same segment of the data log. For example, such similar lifetimes of a group of data blocks can be designated as "short," "shorter," or "shortest" similar lifetimes, "long," "longer," or "longest" similar lifetimes, "mid-range" similar lifetimes, or any other suitable lifetime designation.

By storing a group of data blocks having short similar lifetimes as a data stream in the same segment of a data log implemented on an SSD, the likelihood that some or all of the data blocks in the group will be modified and/or invalidated together is increased, thereby reducing the processing overhead required to perform garbage collection functions to reclaim storage space for that segment of the data log. Further, by storing a group of data blocks having long similar lifetimes as a data stream in the same segment of the data log, the likelihood that some or all of the data blocks in the group will be archived together is also increased. Moreover, by storing a group of data blocks having mid-range similar lifetimes as a data stream in the same segment of the data log, garbage collection functions can be performed to reclaim storage space occupied by invalidated data blocks in that segment, and any remaining valid data blocks in that segment can be written to the same next unoccupied (or available) segment of the data log, and optionally comingled with other valid data blocks having similar lifetimes from one or more different data streams. In this way, the likelihood that some or all of the data blocks from the same or different data streams will be modified, invalidated, and/or archived together as a group is increased, again reducing the processing overhead required to perform garbage collection functions to reclaim storage space for that segment of the data log.

In certain embodiments, a method of handling data with different lifetime characteristics in a data storage system includes forming one or more groups of data blocks from an incoming data flow, in which the respective data blocks in each group have similar lifetimes, and writing the one or more groups of data blocks having similar lifetimes as log structured data to one or more storage segments of a data log, respectively. The one or more groups of data blocks include a respective group of data blocks written as log structured data to a respective storage segment among the one or more storage segments of the data log. The method further includes, in response to the respective group of data blocks being invalidated together, performing at least one garbage collection function on the respective group of invalidated data blocks, thereby making the respective storage segment available for reuse.

In certain arrangements, the method further includes monitoring lifetime characteristics of each data block in the respective groups of data blocks. The lifetime characteristics provide locality information for the data blocks in each respective group of data blocks.

In certain arrangements, the method further includes associating a stream identifier (ID) with each data block in each respective group of data blocks having shortest similar lifetimes, mid-range similar lifetimes, and longest similar lifetimes based on the monitored lifetime characteristics.

In certain arrangements, the writing of the one or more groups of data blocks having similar lifetimes includes (i) writing the group of data blocks having the shortest similar lifetimes, (ii) writing the group of data blocks having the mid-range similar lifetimes, and (iii) writing the group of data blocks having the longest similar lifetimes, as log structured data to respective adjacent or non-adjacent storage segments of the data log.

In certain arrangements, the method further includes, for each group of data blocks written to a respective segment among the adjacent or non-adjacent storage segments of the data log, storing metadata containing information about the data blocks. The information includes the stream ID, the locality information, and a segment ID of the respective segment.

In certain arrangements, the respective group of data blocks being invalidated together corresponds to the group of data blocks having the shortest similar lifetimes, and the performing of the at least one garbage collection function on the respective group of invalidated data blocks includes invalidating each data block in the group of data blocks having the shortest similar lifetimes, and erasing each invalidated data block from the respective segment.

In certain arrangements, the respective group of data blocks being invalidated together corresponds to the group of data blocks having the longest similar lifetimes, and the performing of the at least one garbage collection function on the respective group of invalidated data blocks includes copying the group of data blocks having the longest similar lifetimes to archival data storage.

In certain arrangements, the group of data blocks written to the respective segment of the data log corresponds to the group of data blocks having the mid-range similar lifetimes, and the method further includes (i) invalidating one or more data blocks in the group of data blocks written to the respective segment, (ii) having invalidated the one or more data blocks in the group of data blocks, combining or consolidating any valid data blocks remaining in the respective segment, (iii) copying the valid data blocks to a next available segment of the data log, and (iv) erasing the group of data blocks having the mid-range similar lifetimes from the respective segment.

In certain arrangements, the valid data blocks copied to the next available segment of the data log include data blocks having shorter similar lifetimes or longer similar lifetimes, and the method further includes (i) comingling the data blocks having the shorter similar lifetimes with other valid data blocks having the shorter similar lifetimes from one or more different streams, or (ii) comingling the data blocks having the longer similar lifetimes with other valid data blocks having the longer similar lifetimes from the one or more different streams.

In certain embodiments, a data storage system includes a memory, and processing circuitry configured to execute program instructions out of the memory to form one or more groups of data blocks from an incoming data flow, in which the respective data blocks in each group have similar lifetimes, and to write the one or more groups of data blocks having similar lifetimes as log structured data to one or more storage segments of a data log, respectively. The one or more groups of data blocks include a respective group of data blocks written as log structured data to a respective storage segment among the one or more storage segments of the data log. The processing circuitry is further configured to execute the program instructions out of the memory, in response to the respective group of data blocks being invalidated together, to perform at least one garbage collection function on the respective group of invalidated data blocks, thereby making the respective storage segment available for reuse.

In certain embodiments, a computer program product includes a set of non-transitory, computer-readable media having instructions that, when executed by control circuitry of a computerized apparatus, cause the control circuitry to perform a method of handling data with different lifetime characteristics in a data storage system. The method includes forming one or more groups of data blocks from an incoming data flow, in which the respective data blocks in each group have similar lifetimes, and writing the one or more groups of data blocks having similar lifetimes as log structured data to one or more storage segments of a data log, respectively. The one or more groups of data blocks include a respective group of data blocks written as log structured data to a respective storage segment among the one or more storage segments of the data log. The method further includes, in response to the respective group of data blocks being invalidated together, performing at least one garbage collection function on the respective group of invalidated data blocks, thereby making the respective storage segment available for reuse.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views.

FIG. 3b is a block diagram illustrating a garbage collection function being performed on a stream of data blocks having shortest similar lifetimes in the data log of FIG. 3a;

FIG. 3c is a block diagram illustrating a garbage collection function being performed on a stream of data blocks having longest similar lifetimes in the data log of FIG. 3a;

FIG. 3d is a block diagram illustrating a garbage collection function being performed on a stream of data blocks having mid-range similar lifetimes in the data log of FIG. 3a;

FIG. 3e is a block diagram illustrating the comingling of valid data blocks having similar lifetimes from a plurality of different data streams in the data log of FIG. 3a; and FIG. 4 is a flow diagram of an exemplary method of handling data with different lifetime characteristics in a stream-aware data storage system.

DETAILED DESCRIPTION

The disclosure of International Patent Application No. PCT/RU2019/000523 filed Jul. 25, 2019 entitled HANDLING DATA WITH DIFFERENT LIFETIME CHARACTERISTICS IN STREAM-AWARE DATA STORAGE EQUIPMENT is hereby incorporated herein by reference in its entirety.

Techniques are disclosed herein for handling data with different lifetime characteristics in stream-aware data storage systems. The data storage systems can include a file system that has a log-based architecture design, and can employ one or more solid state drives (SSDs) that provide log-based data storage, which can include a data log divided into a series of storage segments. The disclosed techniques can be employed in the data storage systems to control the placement of data in the respective segments of the data log based at least on the lifetime of the data, significantly reducing the processing overhead associated with performing garbage collection functions within the SSDs.

Figure 1:
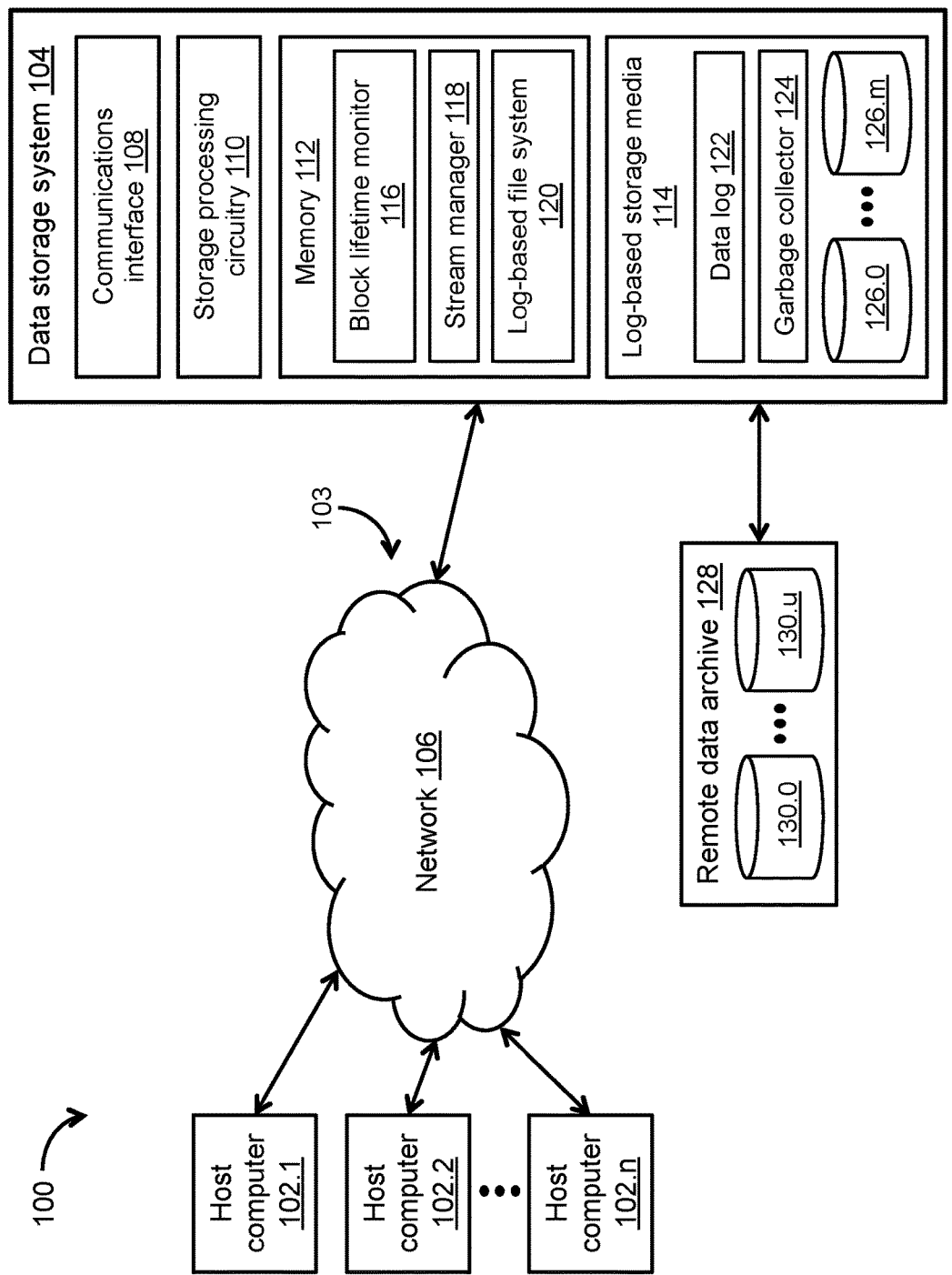
FIG. 1 is a block diagram of an exemplary storage environment, in which techniques can be practiced for handling data with different lifetime characteristics in a stream-aware data storage system.

FIG. 1 depicts an illustrative embodiment of an exemplary storage environment 100, in which techniques can be practiced for handling data with different lifetime characteristics in a stream-aware data storage system. As shown in FIG. 1, the storage environment 100 can include a plurality of host computers 102.1, 102.2, . . . , 102.n, a data storage system 104, a remote data archive 128, and a communications medium 103 that includes at least one network 106. For example, each of the plurality of host computers 102.1, . . . , 102.n can be configured as a web server computer, a file server computer, an email server computer, an enterprise server computer, or any other suitable client or server computer or computerized device. The plurality of host computers 102.1, . . . , 102.n can be further configured to provide, over the network 106, storage input/output (TO) requests (e.g., small computer system interface (SCSI) commands, network file system (NFS) commands) to the data storage system 104. For example, such storage IO requests (e.g., write requests, read requests) can direct the data storage system 104 to write and/or read data blocks, data files, data pages, and/or other data elements (also referred to herein as "host data") to/from file systems, logical units (LUNs), and/or any other suitable storage objects maintained in association with the data storage system 104.

The communications medium 103 can be configured to interconnect the plurality of host computers 102.1, . . . , 102.n with the data storage system 104 to enable them to communicate and exchange data and/or control signaling. As shown in FIG. 1, the communications medium 103 can be illustrated as a "cloud" to represent different communications topologies such as a backbone topology, a hub-and-spoke topology, a loop topology, an irregular topology, and so on, or any suitable combination thereof. As such, the communications medium 103 can include copper-based data communications devices and cabling, fiber optic devices and cabling, wireless devices, and so on, or any suitable combination thereof. The communications medium 103 can be further configured to support storage area network (SAN)-based communications, network attached storage (NAS)-based communications, local area network (LAN)-based communications, metropolitan area network (MAN)-based communications, wide area network (WAN)-based communications, wireless communications, distributed infrastructure communications, and/or any other suitable communications.

The data storage system 104 can include a communications interface 108, storage processing circuitry 110, a memory 112, and log-based storage media 114. The communications interface 108 can include SCSI target adapters, network interface adapters, and/or any other suitable adapters for converting electronic, wireless, and/or optical signals received over the network 106 to a form suitable for use by the storage processing circuitry 110. The memory 112 can include persistent memory (e.g., flash memory, magnetic memory) and non-persistent memory (e.g., dynamic random access memory (DRAM), static random access memory (SRAM)). Further, the memory 112 can accommodate specialized software constructs including a least a block lifetime monitor 116, a stream manager 118, a log-based file system 120, and/or any other suitable software construct(s). The log-based storage media 114 can accommodate specialized hardware constructs (e.g., processor or processing circuitry, memory) and/or software constructs including a data log 122, a garbage collector 124, and/or any other suitable hardware/software construct(s), as well as one or more non-volatile storage devices 126.0, . . . , 126.m such as solid state drives (SSDs). The data log 122 can be implemented on one or more of the SSDs 126.0, . . . , 126.m, and can be divided into a series of storage segments of equal or varying size. The data storage system 104 is communicably coupled to the remote data archive 128, which can include one or more non-volatile storage devices 130.0, . . . , 130.0 suitable for archival data storage such as hard disk drives (HDDs).

The block lifetime monitor 116 can be configured to monitor and determine lifetime characteristics for each data block received at the data storage system 104 in an incoming flow of data. As employed herein, the term "lifetime characteristics" or simply "lifetime" of a data block refers to how frequently the data block is modified, updated, overwritten, unmapped, read, and/or otherwise accessed within the data storage system 104. For example, the lifetime of a data block can be determined by obtaining the time difference(s) or interval(s) between points in time when the data block is accessed in response to successive storage IO requests. The average lifetime of a data block can also be determined by obtaining the average of several such time differences or intervals. It is noted that the lifetime of one or more data blocks can also be determined from their locality information, which can include temporal locality information and spatial locality information. As employed herein, the term "temporal locality" refers to a number of data block addresses referenced by storage IO requests per unit time. For example, if the temporal locality of references to a data block address is high, then it is likely that the data block at that address will be accessed again soon. Further, the term "spatial locality" refers to a number of data block addresses referenced by storage IO requests per unit address space. For example, if the spatial locality of references relative to a data block address is high, then it is likely that another data block address(es) close to that data block address will also be accessed.

The block lifetime monitor 116 can be further configured to track the lifetime characteristics of data blocks from the incoming flow of data, and to form one or more groups of data blocks having similar lifetimes. For example, a group of data blocks, in which the data blocks are accessed most frequently, can be formed and designated as having data blocks with the "shortest" similar lifetimes. Further, another group of data blocks, in which the data blocks are accessed least frequently, can be formed and designated as having data blocks with the "longest" similar lifetimes. In addition, still another group of data blocks, in which the data blocks are accessed at a rate between those corresponding to the shortest similar lifetimes and the longest similar lifetimes, can be formed and designated as having data blocks with "mid-range" similar lifetimes.

The storage processing circuitry 110 can include one or more physical storage processors or engines (running specialized software), data movers, director boards, blades, IO modules, storage drive controllers, switches, and/or any other suitable computer hardware or combination thereof. For example, the storage processing circuitry 110 can execute program instructions out of the memory 112, process storage IO requests (e.g., write requests, read requests) provided by the respective host computers 102.1, . . . , 102.n over the network 106, and store host data in any suitable storage environment (e.g., a redundant array of independent disks (RAID) environment) implemented by the SSDs 126.0, . . . , 126.m.

In the context of the storage processing circuitry 110 being implemented using one or more processors running specialized software, a computer program product can be configured to deliver all or a portion of the specialized software constructs to the respective processor(s). Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. The non-transient computer-readable storage media can be encoded with sets of instructions that, when executed by the respective processor(s), perform the techniques disclosed herein.

During operation, the data log 122 included in the log-based storage media 114 can be divided into a series of storage segments of equal or varying size. A variety of techniques can be employed to partition the data log 122 into the series of storage segments based on, for example, block addresses, RAID groups, RAID extents, or device extents. In certain embodiments, the series of storage segments are distributed across different storage tiers, such as a high speed tier of solid state devices (SSDs), a medium speed tier of serial attached SCSI (SAS) devices, a low speed tier of near-line SAS devices, and so on. Once a group of data blocks having similar lifetimes contains a full segment's worth of data, the stream manager 118 can to associate, bind, and/or assign a stream identifier (ID) to each data block in the group, and to write the group of data blocks with the same stream ID to logical addresses of the log-based file system 120. The log-based file system 120 can, in turn, write the group of data blocks with the same stream ID to physical addresses corresponding to the same next adjacent or non-adjacent unoccupied (or available) segment of the data log 122. In the event one or more data blocks in the group is modified, updated, overwritten, unmapped, or otherwise invalidated, the garbage collector 124 can perform garbage collection functions to reclaim storage space in the segment and reduce fragmentation. For example, such garbage collection functions can include combining or consolidating any remaining valid data blocks in the storage segment, copying the valid data blocks to unoccupied storage space in a next available segment of the data log 122, and/or erasing the data blocks in the segment to make its storage space available for reuse. By controlling the placement of data blocks in the respective segments of the data log 122 based at least on the lifetime of each data block, the processing overhead associated with performing such garbage collection functions can be significantly reduced.

The disclosed techniques for handling data with different lifetime characteristics in a stream-aware data storage system will be further understood with reference to the following illustrative example, as well as FIGS. 1, 2, and 3a-3e. In this example, the data storage system 104 (see FIG. 1) services host-generated storage IO requests (e.g., write requests, read requests), which direct the data storage system 104 to write and/or read data blocks of an incoming data flow 202 to/from logical addresses of the log-based file system 120.

Figure 2:
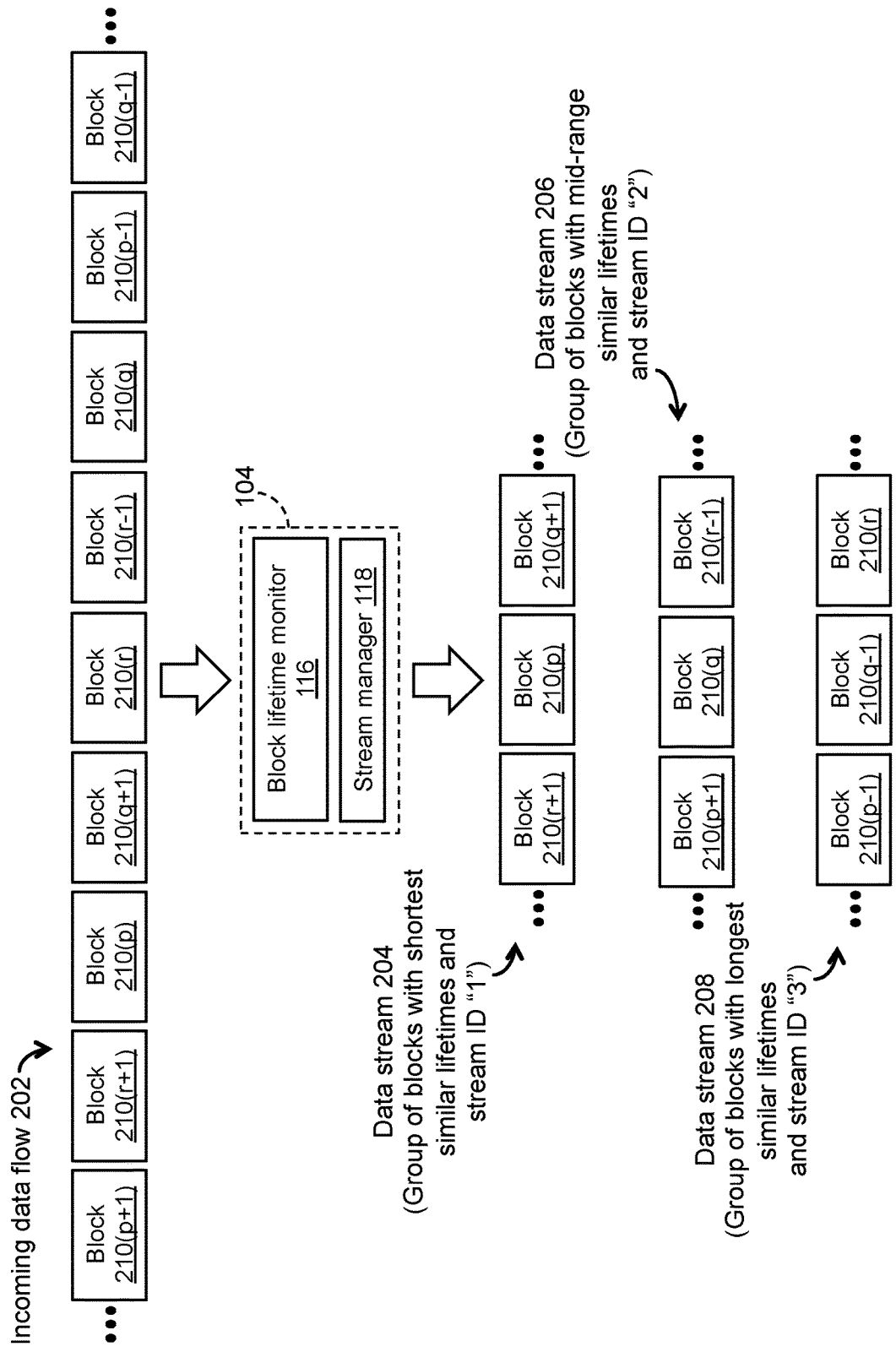
FIG. 2 is a block diagram of an exemplary block lifetime monitor and an exemplary stream manager included in the data storage system of FIG. 1, for use in forming, as one or more data streams, one or more groups of data blocks having similar lifetimes, respectively.

FIG. 2 depicts the incoming data flow 202, which includes, in the order of the storage IO requests, at least a block 210($p$+1), a block 210($r$+1), a block 210($p$), a block 210($q$+1), a block 210($r$), a block 210($r$−1), a block 210($q$), a block 210($p$−1), and a block 210($q$−1). As shown in FIG. 2, the incoming data flow 202 is operated on by the block lifetime monitor 116, which monitors and/or determines the lifetime of each data block in the incoming data flow 202, and forms a plurality of groups of data blocks having similar lifetimes. In this example, the plurality of groups of data blocks include a first group including at least the blocks 210($r$+1), 210($p$), 210($q$+1) having the shortest similar lifetimes, a second group including at least the blocks 210($p$+1), 210($q$), 210($r$−1) having mid-range similar lifetimes, and a third group including at least the blocks 210($p$−1), 210($q$−1), 210($r$) having the longest similar lifetimes.

As further shown in FIG. 2, each respective group of data blocks having similar lifetimes is operated on by the stream manager 118, which associates, binds, and/or assigns a stream ID to each data block in the respective group, and writes the respective group of data blocks with the same stream ID to logical addresses of the log-based file system 120. In this example, the stream ID "1" is assigned to the first group of blocks 210($r$+1), 210($p$), 210($q$+1), the stream ID "2" is assigned to the second group of blocks 210($p$+1), 210($q$), 210($r$−1), and the stream ID "3" is assigned to the third group of blocks 210(p–1), 210(q–1), 210(r). In this way, a data stream 204 is generated that includes the first group of data blocks with the shortest similar lifetimes and stream ID "1," a data stream 206 is generated that includes the second group of data blocks with the mid-range similar lifetimes and stream ID "2," and a data stream 208 is generated that includes the third group of data blocks with the longest similar lifetimes and stream ID "3." Once the data streams 204, 206, 208 are generated, the log-based file system 120 can write each group of data blocks in the respective data streams 204, 206, 208 to physical addresses corresponding to a same next unoccupied (or available) segment of the data log 122.

Figure 3A:
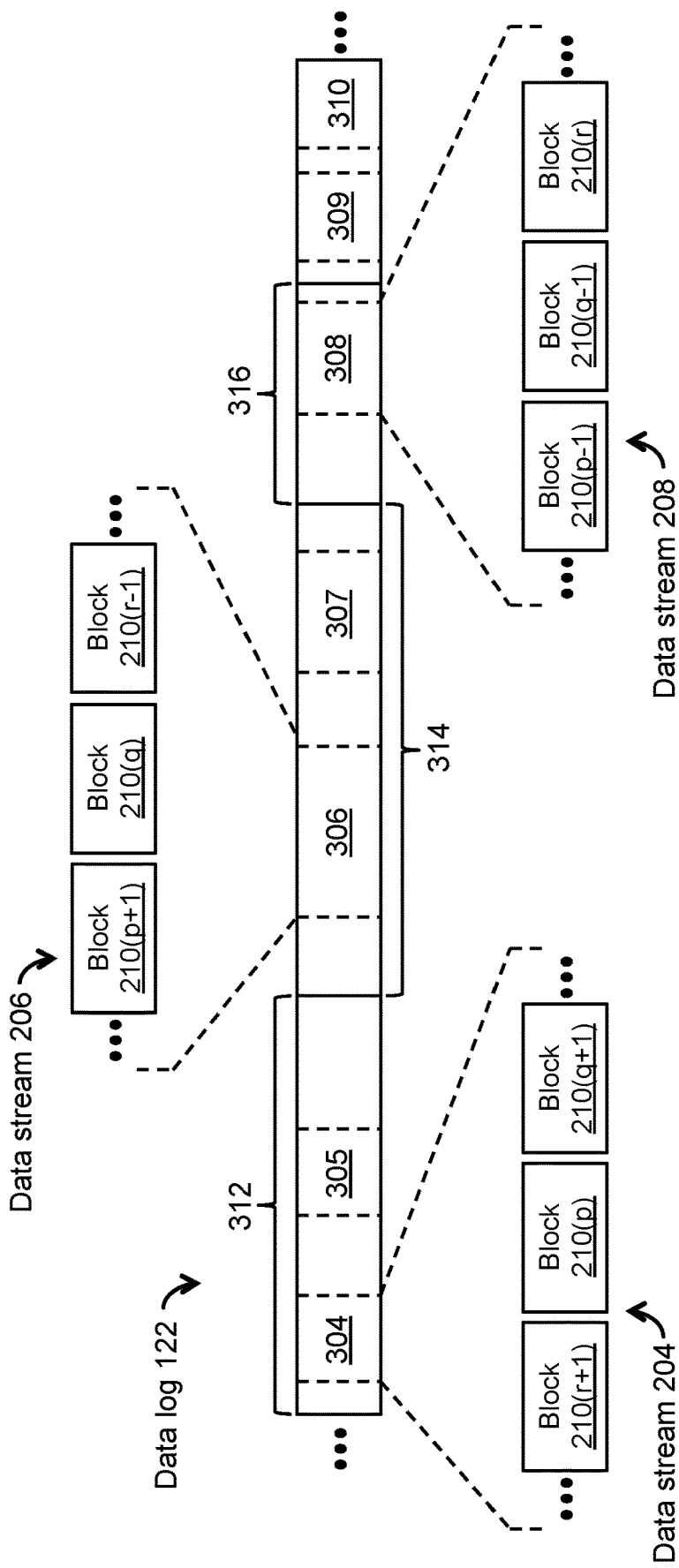
FIG. 3a is a block diagram of a data log included in log-based data storage associated with the data storage system of FIG. 1, illustrating the placement of the data streams of FIG. 2 in respective segments of the data log.

FIG. 3a depicts an exemplary embodiment of the data log 122, which is divided into a series of storage segments of equal or varying size, including at least a storage segment 304, a storage segment 305, a storage segment 306, a storage segment 307, a storage segment 308, a storage segment 309, and a storage segment 310. In this example, the data stream 204 including the first group of blocks 210(r+1), 210(p), 210(q+1) is written to the same segment 304, the data stream 206 including the second group of blocks 210(p+1), 210(q), 210(r–1) is written to the same segment 306, and the data stream 208 including the third group of blocks 210(p–1), 210(q–1), 210(r) is written to the same segment 308. It is noted that a number of storage segments 312, including the storage segments 304, 305, can be used to store data blocks corresponding to the data stream 204. Likewise, a number of storage segments 314, including the storage segments 306, 307, can be used to store data blocks corresponding to the data stream 206, and a number of storage segments 316, including the storage segment 308, can be used to store data blocks corresponding to the data stream 208.

FIG. 3b depicts a garbage collection function performed by the garbage collector 124 on the data stream 204, which includes the first group of blocks 210(r+1), 210(p), 210(q+1) written to the storage segment 304. As described herein, the first group of blocks 210(r+1), 210(p), 210(q+1) (corresponding to the stream ID "1") have the shortest similar lifetimes. In this example, the block 210(r+1), the block 210(p), and the block 210(q+1) are sequentially written as log structured data to the storage segment 304. In addition, metadata is stored (e.g., in the memory 112 and/or log-based storage media 114) containing information about the original blocks 210(r+1), 210(p), 210(q+1), including the stream ID "1," the locality information of the respective blocks 210(r+1), 210(p), 210(q+1), and an identifier of the storage segment 304. Because the first group of blocks 210(r+1), 210(p), 210(q+1) have the shortest similar lifetimes based on their locality information, the likelihood that some or all of the blocks 210(r+1), 210(p), 210(q+1) will be modified and/or invalidated together is increased. In this example, such modifications to the original block 210(r+1), the original block 210(p), and the original block 210(q+1) are represented by a new block 210(r+1), a new block 210(p), and a new block 210(q+1), respectively, which are sequentially written as log structured data to the storage segment 305. In addition, metadata is stored (e.g., in the memory 112 and/or the log-based storage media 114) containing information about the new blocks 210(r+1), 210(p), 210(q+1), including the stream ID "1," the locality information of the respective new blocks 210(r+1), 210(p), 210(q+1), and an identifier of the storage segment 305.

Once the new blocks 210(r+1), 210(p), 210(q+1) are written to the storage segment 305, the garbage collector 124 can perform its garbage collection function, which includes invalidating each of the original blocks 210(r+1), 210(p), 210(q+1) written to the storage segment 304 (as indicated by a cross "X" drawn through each block 210(r+1), 210(p), 210(q+1); see FIG. 3b), and erasing the invalidated blocks 210(r+1), 210(p), 210(q+1) from the storage segment 304 to make its storage space available for reuse. Because the original blocks 210(r+1), 210(p), 210(q+1) having the shortest similar lifetimes were invalidated together by the garbage collector 124, the processing overhead associated with performing its garbage collection function is reduced. For example, the need to combine or consolidate any remaining valid data blocks in the storage segment 304, and to copy the valid data blocks to a next unoccupied (or available) segment of the data log 122, is avoided.

FIG. 3c depicts a garbage collection function performed by the garbage collector 124 on the data stream 208, which includes the third group of blocks 210(p–1), 210(q–1), 210(r) written to the storage segment 308. As described herein, the third group of blocks 210(p–1), 210(q–1), 210(r) (corresponding to the stream ID "3") have the longest similar lifetimes. In this example, the block 210(p–1), the block 210(q–1), and the block 210(r) are sequentially written as log structured data to the storage segment 308. In addition, metadata is stored (e.g., in the memory 112 and/or the log-based storage media 114) containing information about the original blocks 210(p–1), 210(q–1), 210(r), including the stream ID "3," the locality information of the respective blocks 210(p–1), 210(q–1), 210(r), and an identifier of the storage segment 308. Because the third group of blocks 210(p–1), 210(q–1), 210(r) have the longest similar lifetimes based on their locality information, the likelihood that some or all of the blocks 210(p–1), 210(q–1), 210(r) will be archived together is increased. In this example, such archival of the original block 210(p–1), the original block 210(q–1), and the original block 210(r) is represented by an archived block 210(p–1), an archived block 210(q–1), and an archived block 210(r), respectively, which are stored on one or more of the non-volatile storage devices 130.0, . . . , 130.0 (e.g., HDDs) of the remote data archive 128.

To archive the third group of blocks 210(p–1), 210(q–1), 210(r), the garbage collector 124 performs its garbage collection function, which includes copying each of the original blocks 210(p–1), 210(q–1), 210(r) as archived blocks to one or more of the non-volatile storage devices 130.0, . . . , 130.0 (e.g., HDDs) of the remote data archive 128, and erasing the original blocks 210(p–1), 210(q–1), 210(r) from the storage segment 308 to make its storage space available for reuse. Because the original blocks 210(p–1), 210(q–1), 210(r) having the longest similar lifetimes were archived together by the garbage collector 124, the processing overhead associated with performing its garbage collection function is reduced. For example, the need to combine or consolidate any remaining valid data blocks having shorter similar lifetimes in the storage segment 308, and to copy the valid data blocks having shorter similar lifetimes to a next unoccupied (or available) segment of the data log 122, is avoided.

FIG. 3d depicts a garbage collection function performed by the garbage collector 124 on the data stream 206, which includes the second group of blocks 210(p+1), 210(q), 210(r–1) written to the storage segment 306. As described herein, the second group of blocks 210(p+1), 210(q), 210(r–1) (corresponding to the stream ID "2") have the mid-range similar lifetimes. In this example, the block 210(p+1), the block 210(q), and the block 210(r–1) are sequentially written as log structured data to the storage segment 306. In addition, metadata is stored (e.g., in the memory 112 and/or the log-based storage media 114) containing information about the original blocks 210(*p*+1), 210(*q*), 210(*r*−1), including the stream ID "2," the locality information of the respective blocks 210(*p*+1), 210(*q*), 210(*r*−1), and an identifier of the storage segment 306. Because the second group of blocks 210(*p*+1), 210(*q*), 210(*r*−1) have the mid-range similar lifetimes based on their locality information, it is likely that one or more of the blocks 210(*p*+1), 210(*q*), 210(*r*−1) will be modified, while other ones of the blocks 210(*p*+1), 210(*q*), 210(*r*−1) will remain unmodified. In this example, such modifications to the original block 210(*p*+1) and the original block 210(*r*−1) are represented by a new block 210(*p*+1) and a new block 210(*r*−1), respectively, which are sequentially written as log structured data to the storage segment 307 after a previously written block 210(*s*). In addition, metadata is stored (e.g., in the memory 112 and/or the log-based storage media 114) containing information about the new blocks 210(*p*+1), 210(*r*−1), including the stream ID "2," the locality information of the respective new blocks 210(*p*+1), 210(*r*−1), and an identifier of the storage segment 307.

Once the new blocks 210(*p*+1), 210(*r*−1) are written to the storage segment 307, the garbage collector 124 can perform its garbage collection function, which includes invalidating each of the original blocks 210(*p*+1), 210(*r*−1) written to the storage segment 306 (as indicated by a cross "X" drawn through each block 210(*p*+1), 210(*r*−1); see FIG. 3*d*), combining or consolidating any remaining valid data blocks (including the block 210(*q*)) in the storage segment 306, copying the valid data blocks (including the block 210(*q*)) to a next unoccupied (or available) segment (not shown) of the data log 122, and erasing the original blocks 210(*p*+1), 210(*q*), 210(*r*−1) from the storage segment 306 to make its storage space available for reuse.

In this example, at least the previous block 210(*s*), the new block 210(*p*+1), and the new block 210(*r*−1) written to the storage segment 307 can be optionally comingled with other valid data blocks having longer or shorter similar lifetimes from one or more different data streams. For example, as depicted in FIG. 3*e*, the block 210(*s*) can be comingled with one or more other data blocks (such as a block 210(*v*)) having longer similar lifetimes from one or more different streams, and the blocks 210(*s*), 210(*v*) can be sequentially written as log structured data to the segment 309 of the data log 122. As further depicted in FIG. 3*e*, the new blocks 210(*p*+1), 210(*r*−1) can be comingled with one or more other data blocks (such as a block 210(*t*)) having shorter similar lifetimes from one or more different streams, and the new block 210(*p*+1), the new block 210(*r*−1), and the other block 210(*t*) can be sequentially written as log structured data to the segment 310 of the data log 122. In this way, the likelihood that some or all of the data blocks written to the segments 309, 310 will be modified, invalidated, and/or archived together as a group is increased, thereby reducing the processing overhead required to perform garbage collection functions to reclaim storage space for those segments of the data log 122.

An exemplary method of handling data with different lifetime characteristics in a stream-aware data storage system is described below with reference to FIG. 4. As depicted in block 402, one or more groups of data blocks are formed from an incoming data flow, in which the respective data blocks in each group have similar lifetimes. As depicted in block 404, the one or more groups of data blocks having similar lifetimes are written as log structured data to one or more storage segments of a data log, respectively, in which the one or more groups of data blocks include a respective group of data blocks written as log structured data to a respective storage segment among the one or more storage segments of the data log. As depicted in block 406, in response to the respective group of data blocks being invalidated together, at least one garbage collection function is performed on the respective group of invalidated data blocks to make the respective storage segment available for reuse.

Several definitions of terms are provided below for the sole purpose of aiding understanding of the foregoing description, as well as the claims set forth hereinbelow.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may also refer to a storage array including multiple storage devices. Such a storage device may refer to any non-volatile memory (NVM) device, including hard disk drives (HDDs), solid state drivers (SSDs), flash devices (e.g., NAND flash devices, NOR flash devices), and similar devices that may be accessed locally and/or remotely (e.g., via a storage attached network (SAN)). A storage array (or disk array) may refer to a data storage system used for block-based, file-based, or object storage, in which storage arrays can include, for example, dedicated storage hardware containing spinning hard disk drives (HDDs), solid state disk drives, and/or all-flash drives. A data storage entity may be any one or more of a file system, object storage, a virtualized device, a logical unit (LU), a logical unit number (LUN), a logical volume, a logical device, a physical device, and/or a storage medium. A logical unit (LU) may be a logical entity provided by a storage system for accessing data from the storage system. A logical unit (LU) is used interchangeably with a logical volume. A LU or LUN may be used interchangeably with each other. A LUN may be a logical unit number for identifying a logical unit, and may also refer to one or more virtual disks or virtual LUNs, which may correspond to one or more virtual machines. A physical storage unit may be a physical entity, such as a disk or an array of disks, for storing data in storage locations that can be accessed by address, in which a physical storage unit is used interchangeably with a physical volume.

As employed herein, the term "storage medium" may refer to one or more storage media such as a hard drive, a combination of hard drives, flash storage, a combination of flash storage, a combination of hard drives, flash storage, and other storage devices, and other types and/or combinations of computer readable storage media. A storage medium may also refer to both physical and logical storage media, and may include multiple levels of virtual-to-physical mappings, and may be or include an image or disk image. A storage medium may be computer-readable, and may also be referred to as a computer-readable program medium.

As employed herein, the term "TO request" or simply "TO" may be used to refer to an input or output request, such as a data read request or a data write request.

As employed herein, the term "defragmentation" refers to a process performed by a computer to reduce fragmentation by combining portions of data blocks, data files, or portions of other types of data storage units stored across non-contiguous areas of memory. Such combining of portions of data storage units makes subsequent access to the respective types of data storage units more efficient, and makes the resulting freed storage space available for reuse.

As employed herein, the terms, "such as," "for example," "e.g.," "exemplary," and variants thereof, describe non-limiting embodiments and mean "serving as an example, instance, or illustration." Any embodiments described herein using such phrases and/or variants are not necessarily to be construed as preferred or more advantageous over other embodiments, and/or to exclude the incorporation of features from other embodiments. In addition, the term "optionally" is employed herein to mean that a feature or process, etc., is provided in certain embodiments and not provided in other certain embodiments. Any particular embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of handling data with different lifetime characteristics in a data storage system, comprising:
    dividing a data log into a plurality of data log divisions, the plurality of data log divisions including at least a first data log division, and a second data log division, each of the first data log division and the second data log division including a first storage segment and a second storage segment;
    determining similar lifetimes of a plurality of groups of data blocks in at least one first incoming data flow, the plurality of groups of data blocks including at least a first group of data blocks determined to have shortest similar lifetimes, and a second group of data blocks determined to have mid-range similar lifetimes;
    performing a first plurality of data log operations in the first data log division, the first plurality of data log operations including:
        sequentially writing the first group of data blocks determined to have the shortest similar lifetimes as log structured data to the first storage segment of the first data log division, the first group of data blocks being modified in at least one second incoming data flow;
        sequentially writing the modified first group of data blocks as log structured data to the second storage segment of the first data log division; and
        in response to sequentially writing the modified first group of data blocks as log structured data to the second storage segment of the first data log division, invalidating each of the first group of data blocks written to the first storage segment of the first data log division, and erasing the invalidated data blocks from the first storage segment of the first data log division to make storage space within the first data log division available for reuse; and
    performing a second plurality of data log operations in the second data log division, the second plurality of data log operations including:
        sequentially writing the second group of data blocks determined to have the mid-range similar lifetimes as log structured data to the first storage segment of the second data log division, the second group of data blocks being modified in the at least one second incoming data flow;
        sequentially writing the modified second group of data blocks as log structured data to the second storage segment of the second data log division; and
        in response to sequentially writing the modified second group of data blocks as log structured data to the second storage segment of the second data log division, invalidating each of the second group of data blocks written to the first storage segment of the second data log division, and erasing the invalidated data blocks from the first storage segment of the second data log division to make storage space within the second data log division available for reuse.

2. The method of claim 1 wherein the groups of data blocks determined to have similar lifetimes include a third group determined to have longest similar lifetimes, and wherein the method further comprises:
    monitoring lifetime characteristics of each data block in the first group, the second group, and the third group, the lifetime characteristics providing locality information for the data blocks in each of the first group, the second group, and the third group.

3. The method of claim 2 further comprising:
    associating a stream identifier (ID) with each data block in the first group determined to have the shortest similar lifetimes, the second group determined to have the mid-range similar lifetimes, and the third group determined to have the longest similar lifetimes based on the monitored lifetime characteristics.

4. The method of claim 3 wherein the plurality of data log divisions includes a third data log division, the third data log division including a first storage segment, and wherein the method further comprises:
    sequentially writing the third group of data blocks determined to have the longest similar lifetimes as log structured data to the first storage segment of the third data log division.

5. The method of claim 4 further comprising:
    for each of the first group, the second group, and the third group sequentially written to the first storage segment of the first data log division, the first storage segment of the second data log division, and the first storage segment of the third data log division, respectively, storing metadata containing information about the data blocks, the information including the stream ID, the locality information, and a segment ID of the respective segment.

6. The method of claim 5 further comprising:
    copying the third group determined to have the longest similar lifetimes to archival data storage.

7. The method of claim 5 further comprising:
    having invalidated each of the second group of data blocks, combining or consolidating any valid data blocks remaining in the first storage segment of the second data log division;
    copying the valid data blocks to a next available storage segment of the second data log division; and
    erasing the invalidated data blocks from the first storage segment of the second data log division.

8. The method of claim 7 further comprising:
    performing one of (i) comingling valid data blocks having the shorter similar lifetimes with other valid data blocks having the shorter similar lifetimes from one or more different streams, and (ii) comingling valid data blocks having the longer similar lifetimes with other valid data blocks having the longer similar lifetimes from the one or more different streams.

9. A data storage system, comprising:
a memory; and
processing circuitry configured to execute program instructions out of the memory to:
- divide a data log into a plurality of data log divisions, the plurality of data log divisions including at least a first data log division, and a second data log, each of the first data log division and the second data log division including a first storage segment and a second storage segment;
- determine similar lifetimes of a plurality of groups of data blocks in at least one first incoming data flow, the plurality of groups of data blocks including at least a first group of data blocks determined to have shortest similar lifetimes, and a second group of data blocks determined to have mid-range similar lifetimes;
- perform a first plurality of data log operations in the first data log division, the first plurality of data log operations including:
  - sequentially writing the first group of data blocks determined to have the shortest similar lifetimes as log structured data to the first storage segment of the first data log division, the first group of data blocks being modified in at least one second incoming data flow;
  - sequentially writing the modified first group of data blocks as log structured data to the second storage segment of the first data log division; and
  - in response to sequentially writing the modified first group of data blocks as log structured data to the second storage segment of the first data log division, invalidating each of the first group of data blocks written to the first storage segment of the first data log division, and erasing the invalidated data blocks from the first storage segment of the first data log division to make storage space within the first data log division available for reuse; and
- perform a second plurality of data log operations in the second data log division, the second plurality of data log operations including:
  - sequentially writing the second group of data blocks determined to have the mid-range similar lifetimes as log structured data to the first storage segment of the second data log division, the second group of data blocks being modified in the at least one second incoming data flow;
  - sequentially writing the modified second group of data blocks as log structured data to the second storage segment of the second data log division; and
  - in response to sequentially writing the modified second group of data blocks as log structured data to the second storage segment of the second data log division, invalidating each of the second group of data blocks written to the first storage segment of the second data log division, and erasing the invalidated data blocks from the first storage segment of the second data log division to make storage space within the second data log division available for reuse.

10. The data storage system of claim 9 wherein the groups of data blocks determined to have similar lifetimes include a third group determined to have longest similar lifetimes, and wherein the processing circuitry is further configured to execute the program instructions out of the memory to monitor lifetime characteristics of each data block in the first group, the second group, and the third group, wherein the lifetime characteristics provide locality information for the data blocks in each of the first group, the second group, and the third group.

11. The data storage system of claim 10 wherein the processing circuitry is further configured to execute the program instructions out of the memory to associate a stream identifier (ID) with each data block in the first group determined to have the shortest similar lifetimes, the second group determined to have the mid-range similar lifetimes, and the third group determined to have the longest similar lifetimes based on the monitored lifetime characteristics.

12. The data storage system of claim 11 wherein the plurality of data log divisions includes a third data log division, the third data log division including a first storage segment, and wherein the processing circuitry is further configured to execute the program instructions out of the memory to sequentially write the third group of data blocks determined to have the longest similar lifetimes as log structured data to the first storage segment of the third data log division.

13. The data storage system of claim 12 wherein the processing circuitry is further configured to execute the program instructions out of the memory, for each of the first group, the second group, and the third group sequentially written to the first storage segment of the first data log division, the first storage segment of the second data log division, and the first storage segment of the third data log division, respectively, to store metadata containing information about the data blocks, the information including the stream ID, the locality information, and a segment ID of the respective segment.

14. The data storage system of claim 13 wherein the processing circuitry is further configured to execute the program instructions out of the memory to copy the third group determined to have the longest similar lifetimes to archival data storage.

15. The data storage system of claim 13 wherein the processing circuitry is further configured to execute the program instructions out of the memory to:
- having invalidated each of the second group of data blocks, combine or consolidate any valid data blocks remaining in the first storage segment of the second data log division;
- copy the valid data blocks to a next available storage segment of the second data log division; and
- erase the invalidated data blocks from the first storage segment of the second data log division.

16. The data storage system of claim 15 wherein the processing circuitry is further configured to execute the program instructions out of the memory to perform one of (i) comingling valid data blocks having the shorter similar lifetimes with other valid data blocks having the shorter similar lifetimes from one or more different streams, and (ii) comingling valid data blocks having the longer similar lifetimes with other valid data blocks having the longer similar lifetimes from the one or more different streams.

17. A computer program product including a set of non-transitory, computer-readable media having instructions that, when executed by control circuitry of a computerized apparatus, cause the control circuitry to perform a method of handling data with different lifetime characteristics in a data storage system, the method comprising:
- dividing a data log into a plurality of data log divisions, the plurality of data log divisions including at least a first data log division, and a second data log, each of the first data log division and the second data log division including a first storage segment and a second storage segment;

determining similar lifetimes of a plurality of groups of data blocks in at least one first incoming data flow, the plurality of groups of data blocks including at least a first group of data blocks determined to have shortest similar lifetimes, and a second group of data blocks determined to have mid-range similar lifetimes;

performing a first plurality of data log operations in the first data log division, the first plurality of data log operations including:

sequentially writing the first group of data blocks determined to have the shortest similar lifetimes as log structured data to the first storage segment of the first data log division, the first group of data blocks being modified in at least one second incoming data flow;

sequentially writing the modified first group of data blocks as log structured data to the second storage segment of the first data log division; and in response to sequentially writing the modified first group of data blocks as log structured data to the second storage segment of the first data log division, invalidating each of the first group of data blocks written to the first storage segment of the first data log division, and erasing the invalidated data blocks from the first storage segment of the first data log division to make storage space within the first data log division available for reuse; and performing a second plurality of data log operations in the second data log division, the second plurality of data log operations including:

sequentially writing the second group of data blocks determined to have the mid-range similar lifetimes as log structured data to the first storage segment of the second data log division, the second group of data blocks being modified in the at least one second incoming data flow;

sequentially writing the modified second group of data blocks as log structured data to the second storage segment of the second data log division; and in response to sequentially writing the modified second group of data blocks as log structured data to the second storage segment of the second data log division, invalidating each of the second group of data blocks written to the first storage segment of the second data log division, and erasing the invalidated data blocks from the first storage segment of the second data log division to make storage space within the second data log division available for reuse.

18. The computer program product of claim 17 wherein the groups of data blocks determined to have similar lifetimes include a third group determined to have longest similar lifetimes, and wherein the method further comprises:

monitoring lifetime characteristics of each data block in the first group, the second group, and the third group, the lifetime characteristics providing locality information for the data blocks in each of the first group, the second group, and the third group.

* * * * *